US012683915B2

(12) United States Patent
Wu et al.

(10) Patent No.: US 12,683,915 B2
(45) Date of Patent: Jul. 14, 2026

(54) DATA PROCESSING METHOD, APPARATUS, DEVICE AND STORAGE MEDIUM

(71) Applicant: Cloud Intelligence Assets Holding (Singapore) Private Limited, Singapore (SG)

(72) Inventors: Tianlong Wu, Hangzhou (CN); Yu Ding, Hangzhou (CN); Jinda Lu, Hangzhou (CN); Zhiyuan Hou, Hangzhou (CN)

(73) Assignee: Cloud Intelligence Assets Holding (Singapore) Private Limited, Singapore (SG)

( * ) Notice: Subject to any disclaimer, the term of this patent is extended or adjusted under 35 U.S.C. 154(b) by 235 days.

(21) Appl. No.: 18/478,927

(22) Filed: Sep. 29, 2023

(65) Prior Publication Data

US 2024/0031309 A1 Jan. 25, 2024

Related U.S. Application Data

(63) Continuation of application No. PCT/CN2022/077744, filed on Feb. 24, 2022.

(30) Foreign Application Priority Data

Mar. 30, 2021 (CN) .......................... 202110342674.X

(51) Int. Cl.
*H04L 49/354* (2022.01)
*H04L 49/15* (2022.01)

(52) U.S. Cl.
CPC ............ *H04L 49/354* (2013.01); *H04L 49/15* (2013.01)

(58) Field of Classification Search
None
See application file for complete search history.

(56) References Cited

U.S. PATENT DOCUMENTS 7,725,531 B1 * 5/2010 Sood ..................... G06F 9/5022
709/227
9,813,379 B1 * 11/2017 Shevade ................. H04L 45/24
(Continued)

FOREIGN PATENT DOCUMENTS

CN 107800743 A 3/2018
CN 109756431 A 5/2019
(Continued)

OTHER PUBLICATIONS

International Search Report mailed Jun. 6, 2022, from PCT/CN2022/077744, 2 pages.
(Continued)

*Primary Examiner* — Eunsook Choi

(74) *Attorney, Agent, or Firm* — Osha Bergman Watanabe & Burton LLP

(57) ABSTRACT

Data processing method, apparatus, device, and storage medium are provided, so as to improve the efficiency of data processing. The method includes: receiving a function call request; creating a function instance and a virtual network card thereof according to the function call request, to enable the virtual network card to establish communication with at least one gateway node, wherein a gateway service instance of the gateway node is attached with a virtual network card; and sending a data packet corresponding to the function instance after being encapsulated to the gateway node through the virtual network card of the function instance, to enable the gateway node to forward thereof to a virtual private cloud. Based on the virtual network card, data interactions between two instances can be realized, so as to realize the separation of function computing and gateway, and ensure the speed of cold start of function computing.

20 Claims, 10 Drawing Sheets

(56) References Cited

U.S. PATENT DOCUMENTS

| | | | | |
|---|---|---|---|---|
| 10,355,989 | B1 * | 7/2019 | Panchal | ................. H04L 67/10 |
| 10,560,431 | B1 * | 2/2020 | Chen | ...................... H04L 67/10 |
| 10,749,971 | B2 * | 8/2020 | Gupta | .................... H04L 63/02 |
| 2019/0028431 | A1 | 1/2019 | Keller et al. | |
| 2019/0327312 | A1 * | 10/2019 | Gupta | ................. H04L 67/148 |

FOREIGN PATENT DOCUMENTS

| | | | |
|---|---|---|---|
| CN | 111130975 | A | 5/2020 |
| CN | 113300985 | B | 8/2021 |

OTHER PUBLICATIONS

Written Opinion mailed Jun. 6, 2022, from PCT/CN2022/077744, 5 pages.

* cited by examiner

VIRTUAL PRIVATE CLOUD 30

GATEWAY SUBSYSTEM 20

COMPUTING SUBSYSTEM 10

200

202

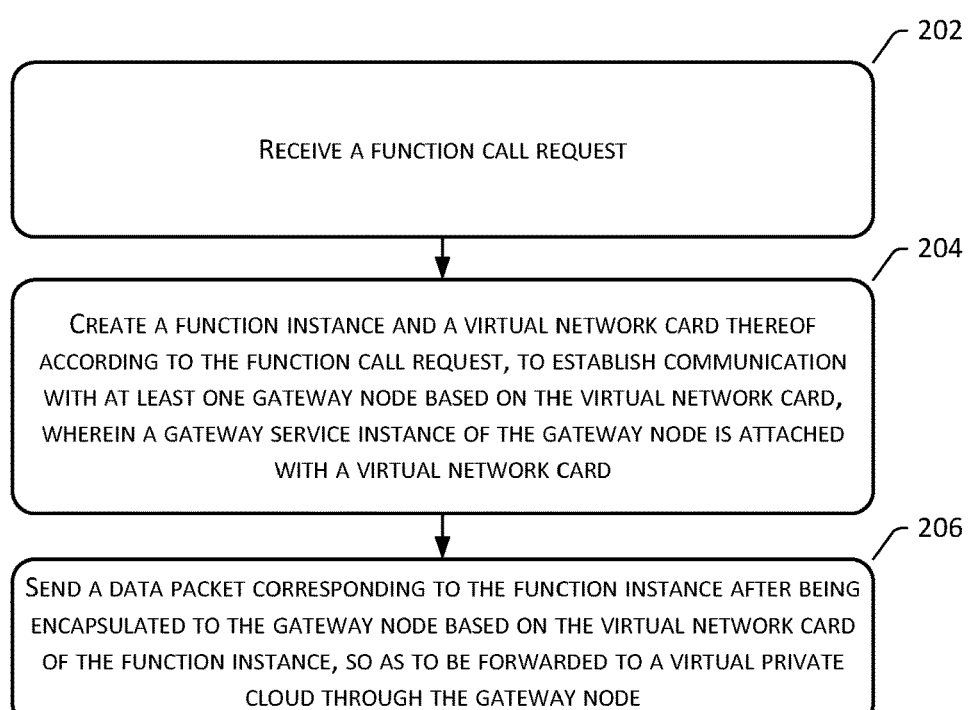

RECEIVE A FUNCTION CALL REQUEST

204

CREATE A FUNCTION INSTANCE AND A VIRTUAL NETWORK CARD THEREOF ACCORDING TO THE FUNCTION CALL REQUEST, TO ESTABLISH COMMUNICATION WITH AT LEAST ONE GATEWAY NODE BASED ON THE VIRTUAL NETWORK CARD, WHEREIN A GATEWAY SERVICE INSTANCE OF THE GATEWAY NODE IS ATTACHED WITH A VIRTUAL NETWORK CARD

206

SEND A DATA PACKET CORRESPONDING TO THE FUNCTION INSTANCE AFTER BEING ENCAPSULATED TO THE GATEWAY NODE BASED ON THE VIRTUAL NETWORK CARD OF THE FUNCTION INSTANCE, SO AS TO BE FORWARDED TO A VIRTUAL PRIVATE CLOUD THROUGH THE GATEWAY NODE

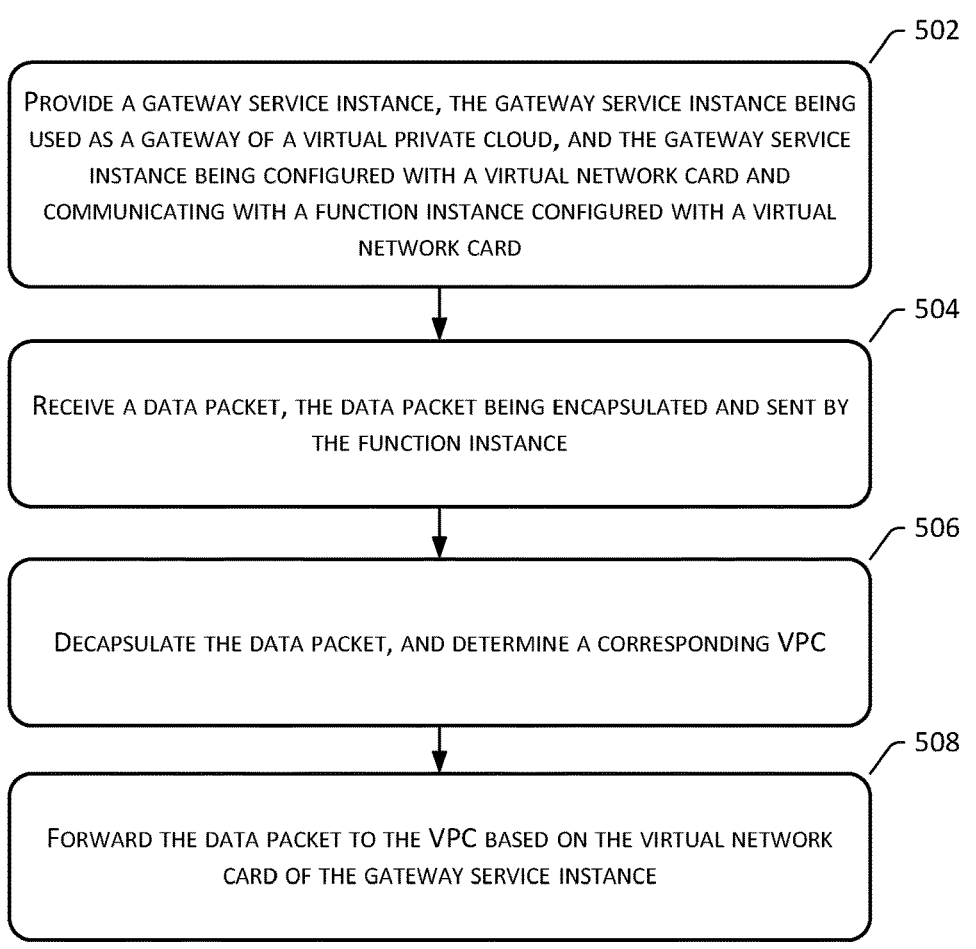

500

502

PROVIDE A GATEWAY SERVICE INSTANCE, THE GATEWAY SERVICE INSTANCE BEING USED AS A GATEWAY OF A VIRTUAL PRIVATE CLOUD, AND THE GATEWAY SERVICE INSTANCE BEING CONFIGURED WITH A VIRTUAL NETWORK CARD AND COMMUNICATING WITH A FUNCTION INSTANCE CONFIGURED WITH A VIRTUAL NETWORK CARD

504

RECEIVE A DATA PACKET, THE DATA PACKET BEING ENCAPSULATED AND SENT BY THE FUNCTION INSTANCE

506

DECAPSULATE THE DATA PACKET, AND DETERMINE A CORRESPONDING VPC

508

FORWARD THE DATA PACKET TO THE VPC BASED ON THE VIRTUAL NETWORK CARD OF THE GATEWAY SERVICE INSTANCE

FIG. 5

DATA PROCESSING METHOD, APPARATUS, DEVICE AND STORAGE MEDIUM

CROSS REFERENCE TO RELATED PATENT APPLICATIONS

This application claims priority to and is a continuation of PCT Patent Application No. PCT/CN2022/077744 filed on 24 Feb. 2022, and is related to and claims priority to Chinese Application No. 202110342674.X, filed on 30 Mar. 2021 and entitled "Data Processing Method, Apparatus, Device and Storage Medium," which are incorporated herein by reference in their entirety.

TECHNICAL FIELD

The present disclosure relates to the field of computer technologies, and in particular to data processing methods and apparatuses, electronic devices, and storage media.

BACKGROUND

A serverless platform is a platform that provides managed services by a third party, and is able to eliminate most of the needs for traditional always-on servers for users.

One of the core competitive abilities of serverless platforms is the speed of cold start. A cold start can realize an on-demand use of resources without reserving instances in advance, and meet delay requirements while improving resource utilization. Some services provided by serverless platforms need to access users' virtual private cloud resources. A computing service is used as an example. It needs to call resources of a user's virtual private cloud during a calculation process, and so needs to realize communication with the user's virtual private cloud.

At present, when a computing service is connected with a virtual private cloud, it is necessary to create an elastic network interface in a user's virtual private cloud, and then attach the elastic network interface on a machine that executes the computing service. However, the attaching speed of the elastic network interface will lead to a longer cold start time of the computing service. In methods that are currently used, the attaching speed of elastic network interface is relatively slow, which affects the speed of cold start.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

Embodiments of the present disclosure provide a data processing method to improve the data processing efficiency.

Correspondingly, the embodiments of the present disclosure also provide a data processing apparatus, an electronic device, and a storage medium, so as to ensure implementations and applications of the above method.

In order to solve the above problems, the embodiments of the present disclosure disclose a data processing method. The method includes: receiving a function call request;

creating a function instance and a virtual network card thereof according to the function call request, to enable the virtual network card to establish communication with at least one gateway node, wherein a gateway service instance of the gateway node is attached with a virtual network card; and sending a data packet corresponding to the function instance after being encapsulated to the gateway node through the virtual network card of the function instance, to enable the gateway node to forward thereof to a virtual private cloud.

The embodiments of the present disclosure also disclose a data processing method, which includes: providing a gateway service instance, the gateway service instance being used as a gateway of a virtual private cloud, and the gateway service instance being configured with a virtual network card and conducting communication with instance(s) configured with virtual network card(s); receiving a data packet based on the virtual network card of the gateway service instance, and sending the data packet after being encapsulated by the instance; decapsulating the data packet, and determining a corresponding virtual private cloud; and forwarding the data packet to the virtual private cloud.

The embodiments of the present disclosure also disclose a data processing apparatus, which includes: a function call module configured to receive a function call request; an instance creation module configured to create a function instance and a virtual network card thereof according to the function call request to enable the virtual network card to establish communication with at least one gateway node, wherein a gateway service instance of the gateway node is attached with a virtual network card; and a data processing module configured to encapsulate a data packet corresponding to the function instance, and send thereof to the gateway node through the virtual network card of the function instance, to enable the gateway node to forward thereof to a virtual private cloud.

The embodiments of the present disclosure also disclose a data processing apparatus, which includes: a gateway service module configured to provide a gateway service instance, the gateway service instance being used as a gateway of virtual private cloud(s), and the gateway service instance being configured with a virtual network card and conducting communication with instance(s) configured with virtual network card(s); a gateway processing module configured to receive a data packet, and send the data packet after being encapsulated by the instance; decapsulate the data packet, and determine a corresponding virtual private cloud; and a data forwarding module configured to forward the data packet to the virtual private cloud based on the virtual network card of the gateway service instance.

The embodiments of the present disclosure also disclose an electronic device, which includes: a processor; and a memory storing executable codes, and the executable codes, when executed, cause the processor to execute the method described in any one of the embodiments of the present disclosure.

The embodiments of the present disclosure also disclose one or more machine-readable media storing executable codes, and the executable codes, when executed, cause the processor to execute the method described in any one of the embodiments of the present disclosure.

The embodiments of the present disclosure also disclose a software product, which includes computer program/instructions, and when the computer program/instructions, when executed, implement the method described in any one of the embodiments of the present disclosure.

Compared with existing technologies, the embodiments of the present disclosure include the following advantages:

In the embodiments of the present disclosure, for a function call request, a function instance can be created and a virtual network card can be configured so as to interact with a gateway node. The gateway node acts as a gateway of a virtual private cloud, and a gateway service instance is attached with a virtual network card. This can realize data interactions between two instances based on the virtual network card, so as to realize a separation of function computing and gateway, and ensure the speed of cold start of function computing.

BRIEF DESCRIPTION OF THE DRAWINGS

FIG. 2 is a processing schematic diagram of an example data processing method of the present disclosure.

FIG. 4A is an interactive schematic diagram of another data processing system according to the embodiments of the present disclosure.

FIG. 5 is a processing schematic diagram of another example data processing method of the present disclosure.

DETAILED DESCRIPTION

In order to make the above objectives, features and advantages of the present disclosure more apparent and comprehensible, the present disclosure will be further described in detail below in conjunction with accompanying drawings and specific implementations.

The embodiments of the present disclosure can be applied to cloud service scenarios. In a cloud service scenario, data resources of each user are located in a virtual private cloud thereof. Therefore, the embodiments of this application can use at least one external gateway node as a gateway of a virtual private cloud to provide access to the virtual private cloud and data forwarding, etc.

A serverless scenario with computing services provided thereby including function computing, etc., is used as an example. When a computing service is needed, a function computing instance can be started through cold start, without the need to reserve the instance in advance, thus achieving use on demand. In a computing service, according to resources in a user's virtual private cloud, it is necessary to use a method of attaching a network card to realize an access to the user's virtual private cloud. However, in existing cold start processes, methods of configuring and attaching a network card often affects the speed of cold start. In order to improve the speed of cold start, the embodiments of the present disclosure use an intermediate node such as a gateway node as a gateway of a virtual private cloud to forward the traffic for accessing the virtual private cloud. After the gateway node completes relevant gateway service configuration, the scaling of a function computing instance is no longer limited by the speed of attaching a network card, and the elasticity capability is also improved.

In implementations, the present disclosure can also be applied in scenarios of performing accesses between different virtual private clouds. A gateway is provided for a virtual private cloud through a gateway service, so that accesses between different virtual private clouds can be realized based on the gateway.

Figure 1:
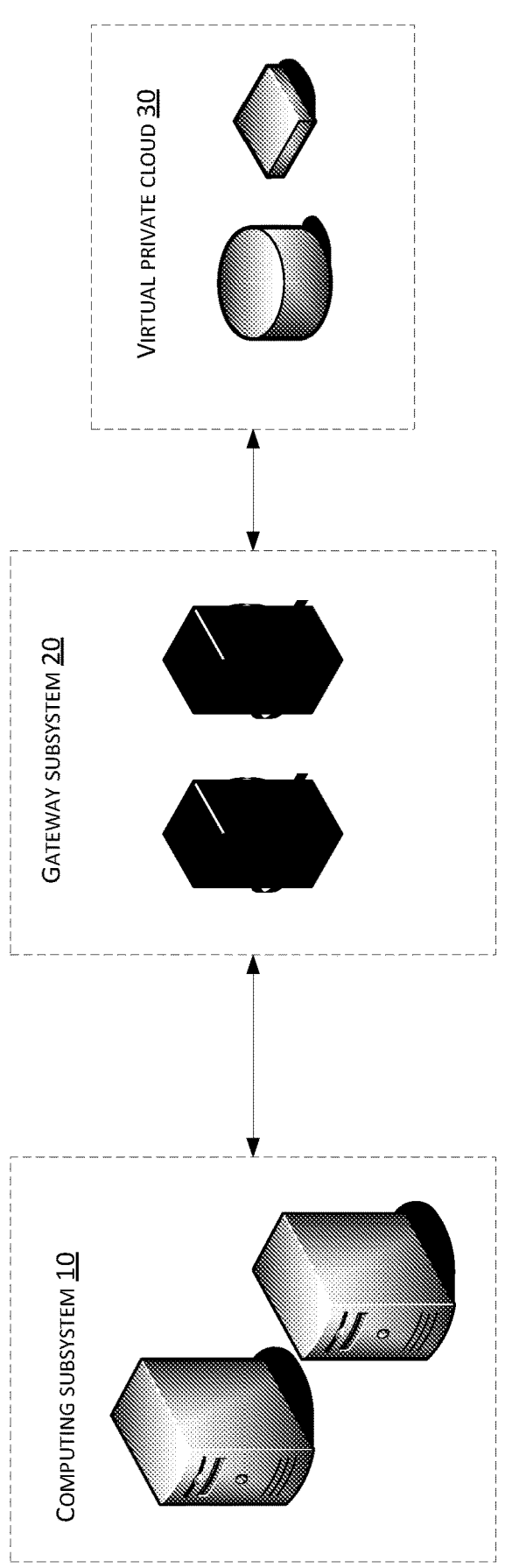
FIG. 1 is an interactive schematic diagram of a data processing system according to the embodiments of the present disclosure.

FIG. 1 shows an interactive schematic diagram of a data processing system. The data processing system includes: a computing subsystem 10, a gateway subsystem 20, and a virtual private cloud 30. The computing subsystem can be understood as a serverless platform, which includes a group of computing nodes (clusters). The gateway subsystem includes multiple gateway nodes. A subsystem of the virtual private cloud includes various types of devices and data storage units in the virtual private cloud. The virtual private cloud conducts external communication through at least one gateway node in the gateway subsystem as an intranet gateway. The data storage unit is used for storing various types of data resources. The data storage unit may include databases, memories, etc. of various architectures.

In order to achieve an access to a user's virtual private cloud, the embodiments of the present disclosure can use at least one gateway node as the user's virtual private cloud to provide a gateway service. A gateway service instance can be set in the gateway node, and a virtual network card can be attached through the gateway service instance.

FIG. 2 shows a flowchart of an example data processing method 200 of the present disclosure.

Step 202: Receive a function call request.

Step 204: Create a function instance and a virtual network card thereof according to the function call request, to establish communication with at least one gateway node based on the virtual network card, wherein a gateway service instance of the gateway node is attached with a virtual network card.

In a computing node, when a function call request is received, a function computing instance, or a function instance, can be started through a cold start. Corresponding function computing processing can then be executed through the function instance. In order to realize communication between a function instance and a gateway of a virtual private cloud, a virtual network card of the function instance can be created based on the function call request, and a corresponding container can be created to attach the virtual network card, so that the virtual network card can realize communication of the function instance with at least one gateway node. The virtual network card is a component to realize network communication, which can be regarded as a network interface. Each virtual network card corresponds to unique address information. As such, in a process of data interaction, routing to the virtual network card is performed based on the address information to realize data interaction. After the virtual network card is attached on the function instance, communication in the network can be realized.

Creating the function instance machine virtual network card according to the function call request includes: obtaining network configuration information according to the function call request, the network configuration information including: a gateway service identifier and a gateway service address; creating the function instance and the virtual network card according to the network configuration information; and creating a network card container, and using the network card container to attach the virtual network card.

The network configuration information is network-related configuration information, and may include, for example, address information of a virtual network card, and may also include a gateway service identifier and a gateway service address, etc. A gateway service identifier is an identifier of a gateway service instance, and each gateway service instance corresponds to a user's virtual private cloud, and the same user's gateway service instance may exist on different gateway nodes. In other words, the embodiments of the application can also configure a group of gateway nodes to provide gateway services. A gateway service address is an address of a virtual network card attached on a gateway service instance.

In some optional embodiments of the present disclosure, a function instance supports accesses to a virtual private cloud and a public network. Therefore, a function instance can correspond to two virtual network cards, one virtual network card (such as a first virtual network card) being used to interact with a gateway service instance, another virtual network card (such as a second virtual network card) being used to interact with a public network. Correspondingly, more than one virtual network card of the function instance can be created according to the network configuration information, and the virtual network card includes at least: a first virtual network card for a virtual private cloud and a second virtual network card for a public network. Creating the network card container and using the network card container to attach the virtual network card may include: creating a network card container for each virtual network card, and using the network card container to attach a corresponding virtual network card.

The embodiments of the present disclosure may also provide a configuration interface, so as to perform access configuration flexibly. For example, before a function call request is initiated, a configuration interface corresponding to function computing can be provided. The configuration interface may include various types of controls, such as function selection controls, controls associated with access control, and the like. A desired function can be selected based on a function selection control. A function access can be controlled based on a control associated with access control. For example, based on a control associated with access control, accesses to a public network or a virtual private cloud can be selected, such as whether to allow a function to access resources of a public network. For another example, a virtual private cloud to be accessed can also be specified based on a control associated with access control, so that resources of the virtual private cloud can be accessed at subsequent times.

The above is only an example of a configuration interface. In actual processing, other access configuration scenarios can also be applied, such as an access configuration between virtual private clouds, etc., which are not limited in the embodiments of the present disclosure.

For ease of distinction, virtual network cards of function instances may also be referred to as a first virtual network card and a second virtual network card, and a virtual network card of a gateway service instance may be referred to as a third virtual network card. Therefore, the network configuration information may include address information of the third virtual network card, and in some examples, may also include address information of the first virtual network card, address information of the second virtual network card, etc. In case when a group of gateway nodes is used, the network configuration information may receive an address of a third virtual network card corresponding to a gateway service instance of the group of gateway nodes.

In implementations, the present disclosure can be applied to a cloud computing service scenario, and a user's virtual private cloud (VPC) can be an isolated private cloud in the cloud. A virtual network card that is used may be an elastic network card (Elastic Network Interface, ENI). An elastic network interface (ENI) is a network resource object provided by an elastic cloud server (Elastic Compute Service, ECS), which can be attached to an ECS instance of the same account or across accounts. Attaching ENI across accounts is a way to connect VPCs across accounts, and ENI can provide a network interface for VPC. A computing subsystem may possess a function execution engine (Execution Engine, EE), which can be a component that executes user functions in function computing, with main functions thereof being to initialize an execution environment and forward call requests. A virtual machine (VM) corresponds to a function execution engine (EE). Therefore, a function execution engine (EE) can create a function instance and perform corresponding processing.

In an example, the function execution engine (EE) includes a function routing component (EE Router) and a function agent component (EE Agent). The function routing component (EE Router) is used for scheduling function computing, creating gateways for function call requests, and allocating containers. For example, the function routing component can adopt a multi-partition (partition) architecture to ensure high availability. The function agent component (EE Agent) is an agent component of function computing on a computing node side, which can be used to create and destroy function instances, and forward function call requests to corresponding function instances. In implementations, the function execution engine (EE) can be configured in a computing node.

The function routing component (EE Router) can initiate a service creation request to the function agent component (EE Agent) based on a gateway service identifier such as a Network Service ID. The request can carry the gateway service identifier. The function agent component (EE Agent) can then create a virtual network card of a function instance, and obtain network card configuration information corresponding to the virtual network card, such as an gateway service address corresponding to a gateway service identifier, such as an address of a Network Service, etc., to realize a network connection with VPC. A corresponding container interface is then called to create a container, a virtual network card is configured based on network card configuration information, and the virtual network card is attached to the container to complete a network connection with a gateway service instance corresponding to a gateway node.

Therefore, the embodiments of the present disclosure can separate a gateway service from a computing cluster in a service-oriented manner, which has certain advantages in terms of technical architecture. Moreover, after a gateway node is ready, scaling of a function instance is no longer limited by the speed of attaching an elastic network card, which improves the elasticity and speed of cold start.

Step 206: Send a data packet corresponding to the function instance after being encapsulated to the gateway node based on the virtual network card of the function instance, so as to be forwarded to a virtual private cloud through the gateway node.

After the network connection is completed, interactions between the function instance and the user's virtual private cloud can be realized. Therefore, data packets that need to be sent to the virtual private cloud can be encapsulated on the function instance side, and then sent to the corresponding gateway node through the virtual network card. The gateway service instance of the gateway node can decapsulate the data packets, and then forward then to the virtual private cloud.

In the embodiments of the present disclosure, function instances, gateway service instances, and the like can be managed through a virtual switch, such as an open virtual switch (Open vSwitch, OVS), on corresponding nodes. A virtual switch can perform management such as creation and configuration of a network card corresponding to an instance, and data processing, etc. In the embodiments of this application, data interactions between a function instance and a gateway service instance can be performed through a network tunnel (tunnel), and the network tunnel (tunnel) can perform data interactions based on a link identifier (tunnel ID). In other words, based on a link identifier (tunnel ID), data encapsulation and forwarding of encapsulated data are performed.

In implementations, sending the data packet corresponding to the function instance after being encapsulated to the gateway node based on the virtual network card of the function instance includes: receiving the data packet; determining a gateway service identifier of the corresponding gateway node when a destination address of the data packet is an intranet address; determining a link identifier according to the gateway service identifier, and using the link identifier to encapsulate the data packet; and sending the encapsulated data packet to the gateway node through the virtual network card of the function instance. The virtual network card of the function instance at least includes: a first virtual network card for the virtual private cloud and a second virtual network card for a public network, to enable data packets of the function instance to be sent to the virtual private cloud or the public network. Therefore, a destination address of a data packet can be determined. If the destination address of the data packet is an intranet address, a determination can be made that the intranet address corresponds to a gateway service identifier of a gateway service instance of a gateway node, and a link identifier is then queried based on the gateway service identifier. Apparently, in some examples, the link identifier can also be determined based on network information of a user's virtual private cloud, and can be specifically determined according to requirements. Based on the link identifier, the data packet can be encapsulated, such as adding the link identifier at a header of the encapsulated data. The purpose of encapsulation can be understood as: the original data packet cannot be sent to the gateway node normally, and so a tunnel (or link) is formed through encapsulation and is sent again.

Therefore, in the embodiments of the present disclosure, a gateway service for a private gateway is realized through a gateway service instance in a gateway node, and an isolation of multiple users can also be realized. The traffic of different users' VPCs is encapsulated on a virtual extended local area network (VXLAN) through different tunnel IDs, to achieve user isolation on the basis of opening up the network.

In the above embodiments, a gateway node is configured with a gateway service instance with a virtual network card attached, so that the gateway service instance acts as a gateway of a user's virtual private cloud, interacts with computing nodes externally, and provides various resources required for function computing. During the above-mentioned process of initial configuration of gateway service instance, various types of configuration information can be sent to computing nodes, which is convenient for the computing nodes to use. The following provides an example of initial interactions between a gateway service instance and a function instance.

Figure 3:
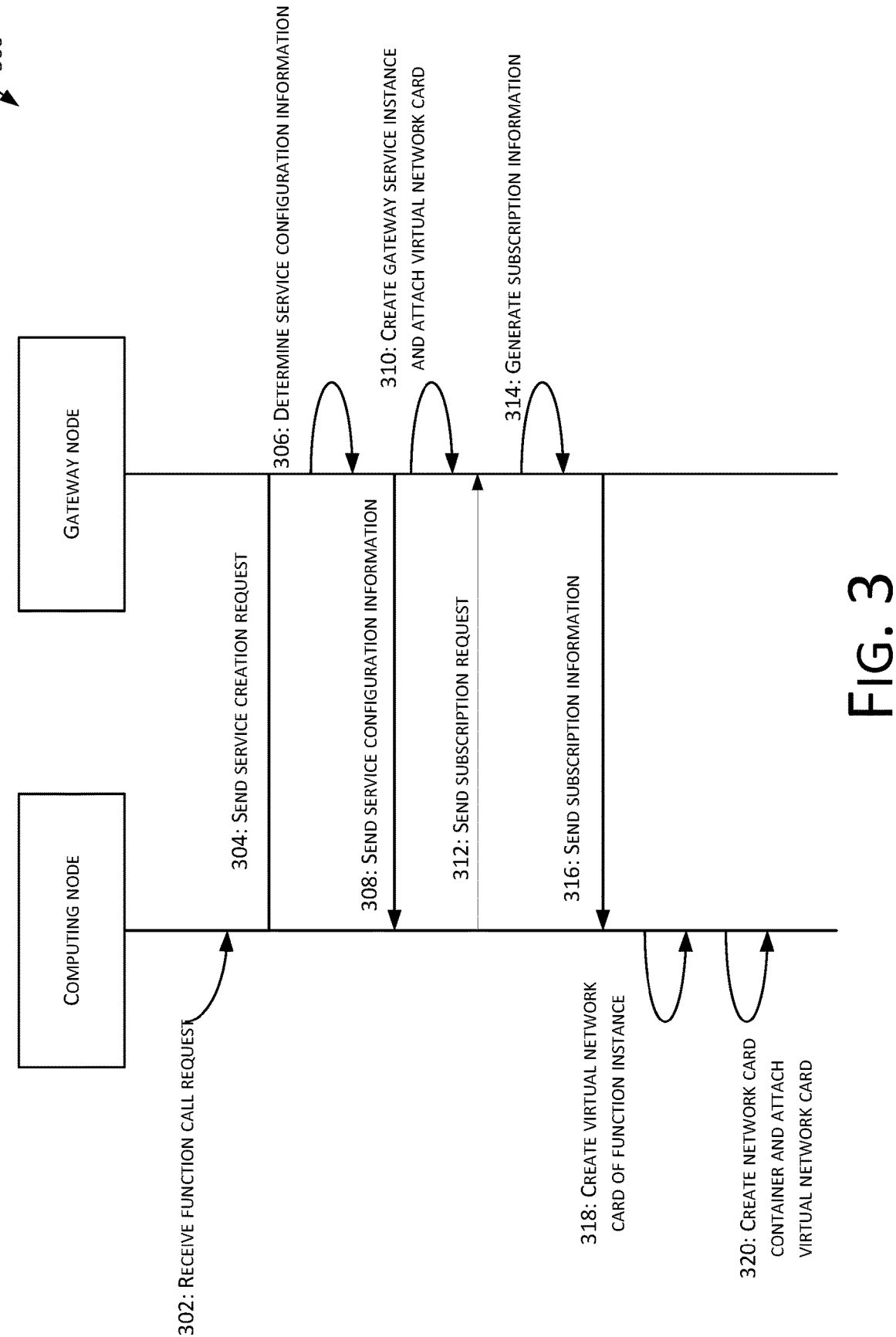
FIG. 3 is an interactive schematic diagram of interactions between data processing parties according to the embodiments of the present disclosure.

FIG. 3 shows a schematic diagram of interactions 300 between data processing parties according to the embodiments of the present disclosure.

Step 302: A computing node receives a function call request.

Step 304: The computing node sends a service creation request to a gateway node according to the received function call request.

After receiving the function call request, the computing node can determine network configuration information of a virtual private cloud corresponding to required resources based on the function call, such as VPC configuration information such as an identifier and a name of the virtual private cloud, and can further determine whether a gateway service identifier of the gateway service instance corresponding to the virtual private cloud is stored. If the gateway service identifier is stored, subsequent processing may be performed directly based on the gateway service identifier. If the gateway service identifier is not stored, a service creation request may be generated and sent to the gateway node. In the embodiments of the present disclosure, in order to ensure data interactions, a gateway service may be provided through a group of gateway nodes, and the group of gateway nodes includes at least one gateway node. Therefore, the service creation request may be sent to the at least one gateway node. In this way, the high availability of the gateway service can be realized through the group of gateway nodes. Each VPC corresponds to at least two gateway nodes, so that other gateway nodes can still provide gateway services when a certain gateway node fails or is abnormal, thus ensuring normal execution of data interactions. A programmable flow table based on OVS (Open Virtual Machine) can realize a determination of a gateway node for performing communication based on loads of gateway nodes, realize load balancing, and dynamic expansion and contraction.

Network configuration information is various types of information required for configuring and interacting with a virtual private cloud, such as an identifier of the virtual private cloud, an identifier of a virtual switch and other configuration information. An identifier of a virtual private cloud is used to determine a virtual private cloud that needs to be accessed, and an identifier of a virtual switch can be used to determine the virtual switch, so as to facilitate a subsequent creation of a virtual network card. Other configuration information can be security information, control information, etc., and can be determined according to configuration requirements. For example, in a subsequent data access process, the access traffic, that is, data packets, can be filtered based on the configuration information. In other words, a determination can be made as to whether a data packet is allowed to access the intranet. In another example, the creation of a virtual network card may be authorized based on control information. Therefore, required information can also be added to a service creation request, so that the gateway node can create a gateway service instance.

Step 306: The gateway node determines service configuration information of a gateway service instance according to the service creation request.

Step 308: The gateway node sends the service configuration information.

An interface corresponding to the service creation request of the computing node is an asynchronous call interface, and the gateway node can create a gateway service object and determine service configuration information such as a corresponding gateway service identifier. The service configuration information is then sent to the computing node, and the computing node can cache the service configuration information. The service creation request is sent to a group of gateway nodes, and correspondingly, a group of service configuration information may also be received. The group of service configuration information includes gateway service identifiers corresponding to the group of gateway nodes.

In an example, a function routing component (EE Router) of a computing node can request service configuration information of a gateway service (Network Service) from a gateway node through a service creation request. Correspondingly, the gateway node can create a network service object, and then return a network service ID as a gateway service identifier. The network service object can provide external services, process and forward data packets, and so a corresponding gateway service instance can be generated based on the network service.

Step 310: The gateway node creates a gateway service instance and attaches a virtual network card thereto.

The gateway node can asynchronously create a gateway service instance of the gateway service object and attach a virtual network card thereto. The gateway service instance of the gateway service object can be created, and a virtual network card (second virtual network card) of the gateway service instance can then be created. The virtual network card can be attached to the gateway service instance to complete an instantiation process of the service.

As in the above example, a gateway service instance such as a gateway Pod can be created asynchronously, with a user's ENI being attached.

Step 312: The computing node sends a subscription request to the gateway service instance of the gateway node.

Step 314: The gateway node generates subscription information according to a gateway service address of the gateway service instance.

Step 316: The gateway node sends the subscription information to the computing node.

Step 318: The computing node creates a virtual network card of the function instance.

Step 320: A network card container is created, and the network card container is used to attach the virtual network card.

The computing node can determine a gateway service identifier of a gateway service instance based on network configuration information, and then create a function instance and a virtual network card of the function instance according to the network configuration information. Such virtual gateway can subscribe to a gateway service of a gateway service node. Therefore, a subscription request can be sent to the gateway service instance of the gateway node. After completing the creation of the gateway service instance and the attaching of the virtual network card, the gateway node can determine a gateway service address corresponding to the virtual network card, generate subscription information based on the gateway service address, and send it to the computing node. The computing node can receive a gateway service address of at least one gateway node, create a virtual network card based on network configuration information such as the gateway service address and a gateway service identifier, create a network card container, attach the virtual network card to the network card container, and complete a network connection between the function instance in the computing node and the gateway service instance in the gateway node.

Figure 4A:
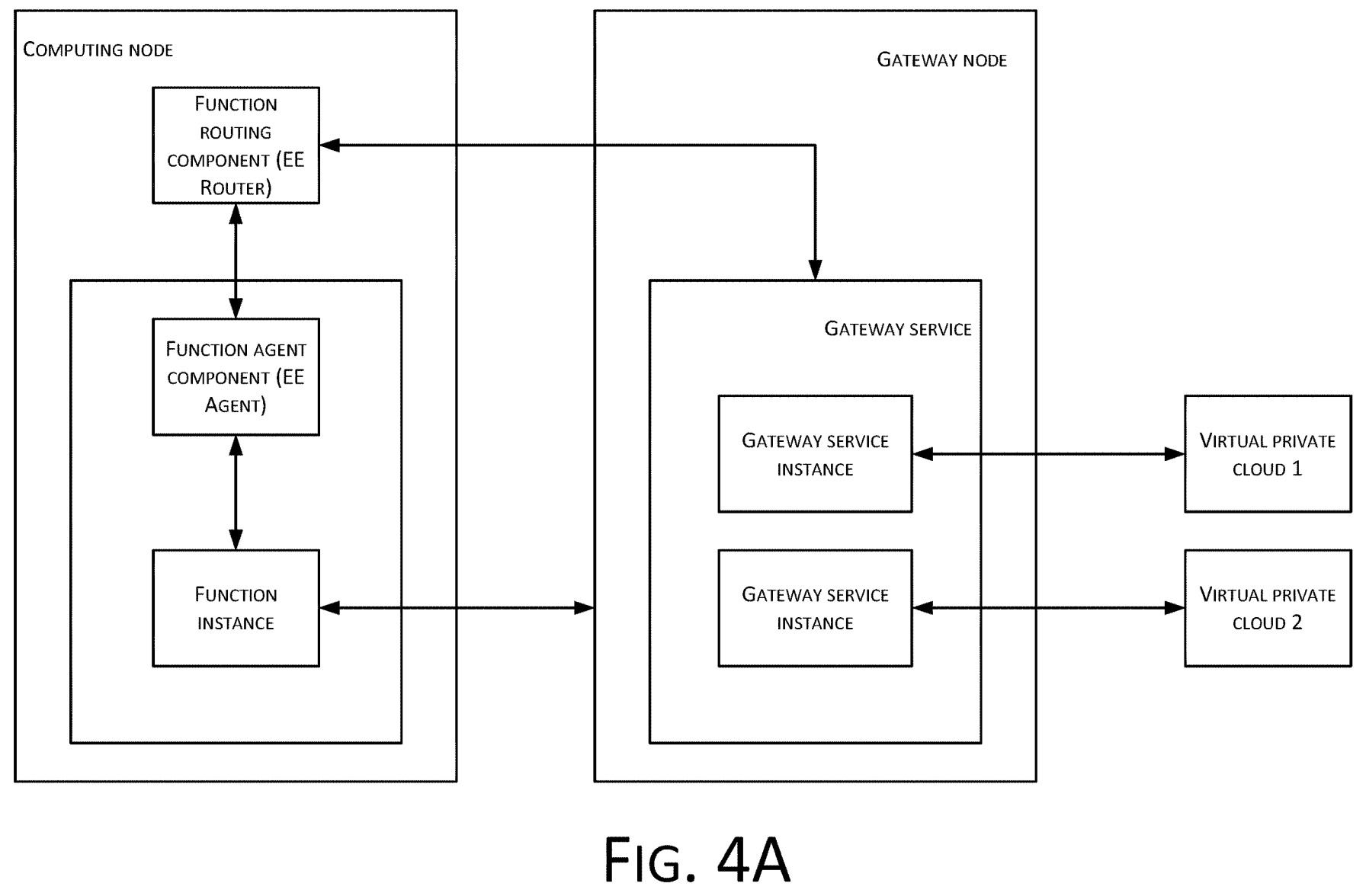

In implementations, as shown in a processing system architecture diagram shown in FIG. 4A, a computing node may include: a function routing component (EE Router), a function agent component (EE Agent), and a network service grid control component (Network Service Manager, NSMgr). NSMgr is a control component of Network Service Mesh, which can be deployed on the computing node to realize communication control between nodes, and can realize communication and interactions among computing nodes, gateway nodes and virtual private clouds.

Figure 4B:
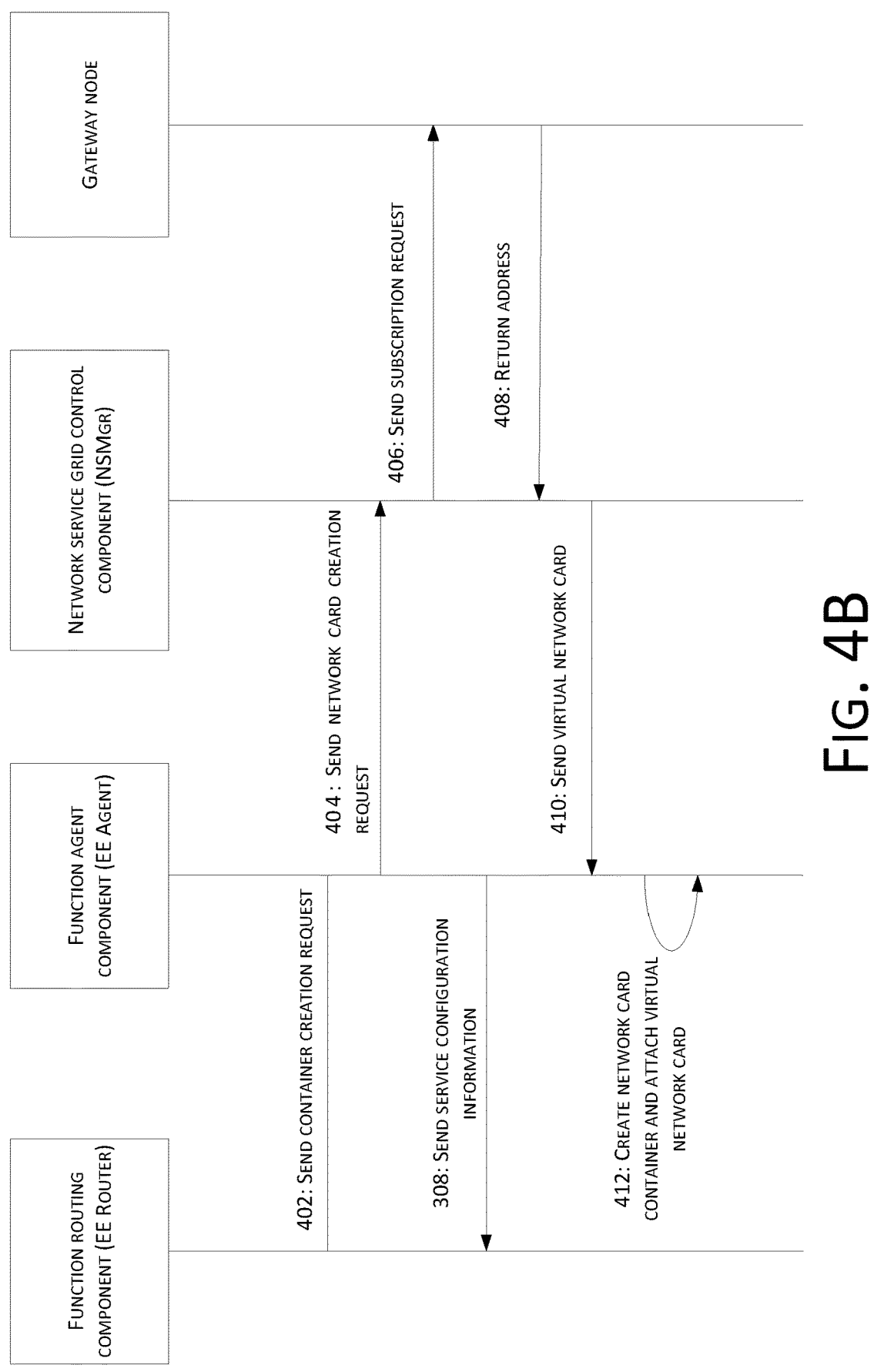
FIG. 4B is an interactive schematic diagram of another data processing party according to the embodiments of the present disclosure.

In one example, the following process may be performed for creating a function instance, as shown in FIG. 4B:

Step 402: A function routing component sends a container creation request to a function agent component.

The above-mentioned process of requesting a gateway service identifier from a gateway node is executed by the function routing component. The function routing component can create a network service for a gateway service according to a VPC configuration of a function. After a network service ID of the network service is obtained, it can be cached. Apparently other service configuration information that is obtained can also be cached together. Afterwards, for the same VPC configuration, the cached network service ID will be reused directly without requesting the gateway node to create one. After obtaining the network service ID, the function routing component will send a request to a function agent component to create a container, which carries the network service ID.

Step 404: The function agent component sends a network card creation request to a network service grid control component.

Step 406: The network service grid control component sends a subscription request to a gateway service instance of a gateway node.

The function agent component calls the network service grid control component (NSMgr) to create a virtual network card. NSMgr will query whether there is a subscription to a VPC gateway service. If not, it will subscribe the address of a network service to a gateway service instance of the VPC gateway service. If a subscription is in place, the address of the network service can be obtained directly without subscribing again.

Step 408: The gateway node returns a gateway service address.

The gateway node creates a gateway service instance such as a gateway Pod, and can send an address of the corresponding gateway Pod, that is, the address of the network service, to NSMgr after ENI is successfully attached. Correspondingly, NSMgr will cache the gateway Pod address information of the network service, and will directly reuse the gateway service address in the cache if it is the same Network Service ID, without submitting a request to the gateway node again.

Step 410: The network service grid control component creates a virtual network card and sends the virtual network card to the function agent component.

NSMgr can create a virtual network card and determine network card configuration information, which can then be fed back to the function agent component.

Step 412: The function agent component creates a network card container, and uses the network card container to attach the virtual network card.

The function agent component can call an interface of a container to create the container, configure a virtual network card based on network card configuration information, and attach the virtual network card into the container.

Therefore, a virtual network card corresponding to a function instance of the computing node can obtain information such as a gateway service address of a gateway service instance corresponding to a user's virtual private cloud, and can support communication and interaction.

In combination with the above process, after requesting related service configuration information and network configuration information of a gateway service instance from the gateway node for the first time, corresponding information can be cached, so that there is no need to request it again. Correspondingly, in a subsequent cold start process of the function instance, there is no need to request it again, but the cache information is directly reused, thereby improving the efficiency.

The above realizes opening a network connection from a computing node to a user VPC. Through a service-oriented approach, a gateway service is separated from a computing cluster, which has certain advantages in terms of technical architecture.

After the above-mentioned network connection is completed, data interaction can be performed. Control of virtual network cards of the computing node and the gateway node can be taken over by a virtual switch OVS. Through flow table rules configured on a control plane, a data packet is encapsulated according to VXLAN and forwarded from a function instance to a correct gateway node. The data packet is decapsulated on the gateway node and forwarded to a corresponding user VPC. The control assigns a different tunnel ID to each user's VPC. A data packet is encapsulated by the computing node based on a tunnel ID and sent to a gateway node. The gateway node determines a routing target according to the decapsulated tunnel ID, and then sends the data packet to a specified user VPC.

When the computing node in the embodiments of the present disclosure executes network routing, one function instance can support simultaneous accesses to a user's virtual private cloud VPC and a public network. Two virtual network cards can be allocated to the computing node, which are used to access the public network and VPC respectively. In the function instance, routing is performed according to destination addresses of data packets that are accessed, and accesses to an intranet segment are routed to the user VPC, and accesses to other network segments are routed to the public network.

On the basis of the foregoing embodiments, the embodiments of the present disclosure further provide a data processing method, which is applied to a gateway node, and can provide a gateway service for a virtual private cloud.

FIG. 5 shows a flowchart of another example data processing method 500 of the present disclosure.

Step 502: Provide a gateway service instance, the gateway service instance being used as a gateway of virtual private cloud(s), and the gateway service instance being configured with a virtual network card and communicating with a function instance configured with a virtual network card.

Step 504: Receive a data packet, the data packet being encapsulated and sent by the function instance.

Step 506: Decapsulate the data packet, and determine a corresponding VPC.

Step 508: Forward the data packet to the VPC based on the virtual network card of the gateway service instance.

After creating a gateway service instance for the user's virtual private cloud, the gateway node can serve as an intranet gateway to provide gateway services for the virtual private cloud, such as being responsible for data forwarding for the virtual private cloud. Therefore, after receiving a data packet, the data packet can be decapsulated based on the virtual network card of the gateway service instance, and a corresponding link identifier can be determined. A corresponding virtual private cloud can then be determined according to the link identifier, and the decapsulated data packet can be sent to this virtual private cloud, thereby performing desired operations. Subsequently, when data in the virtual private cloud needs to be sent externally, such as feeding back data resources to the computing node, a corresponding data packet can be sent to the gateway node. The gateway service instance of the gateway node can encapsulate the data packet, and then send it to the computing node. After the computing node performs decapsulation, a corresponding function instance can perform processing such as function computing, etc.

In a process of creating a gateway service instance, a service creation request may be received. According to the service creation request, service configuration information of a gateway service instance is determined, and the service configuration information includes a gateway service identifier. The service configuration information is sent, and the gateway service instance is created. A virtual network card is created, and the gateway service instance is used to attach the virtual network card. A subscription request is received. Subscription information is generated according to a gateway service address of the gateway service instance, and the subscription information is sent.

On the basis of the above embodiments, a gateway for a VPC can be provided through a gateway service, so that interactions between different VPCs can also be realized based on a gateway service instance of a gateway node, and a cross-tenant VPC network can be opened and established.

Figure 6:
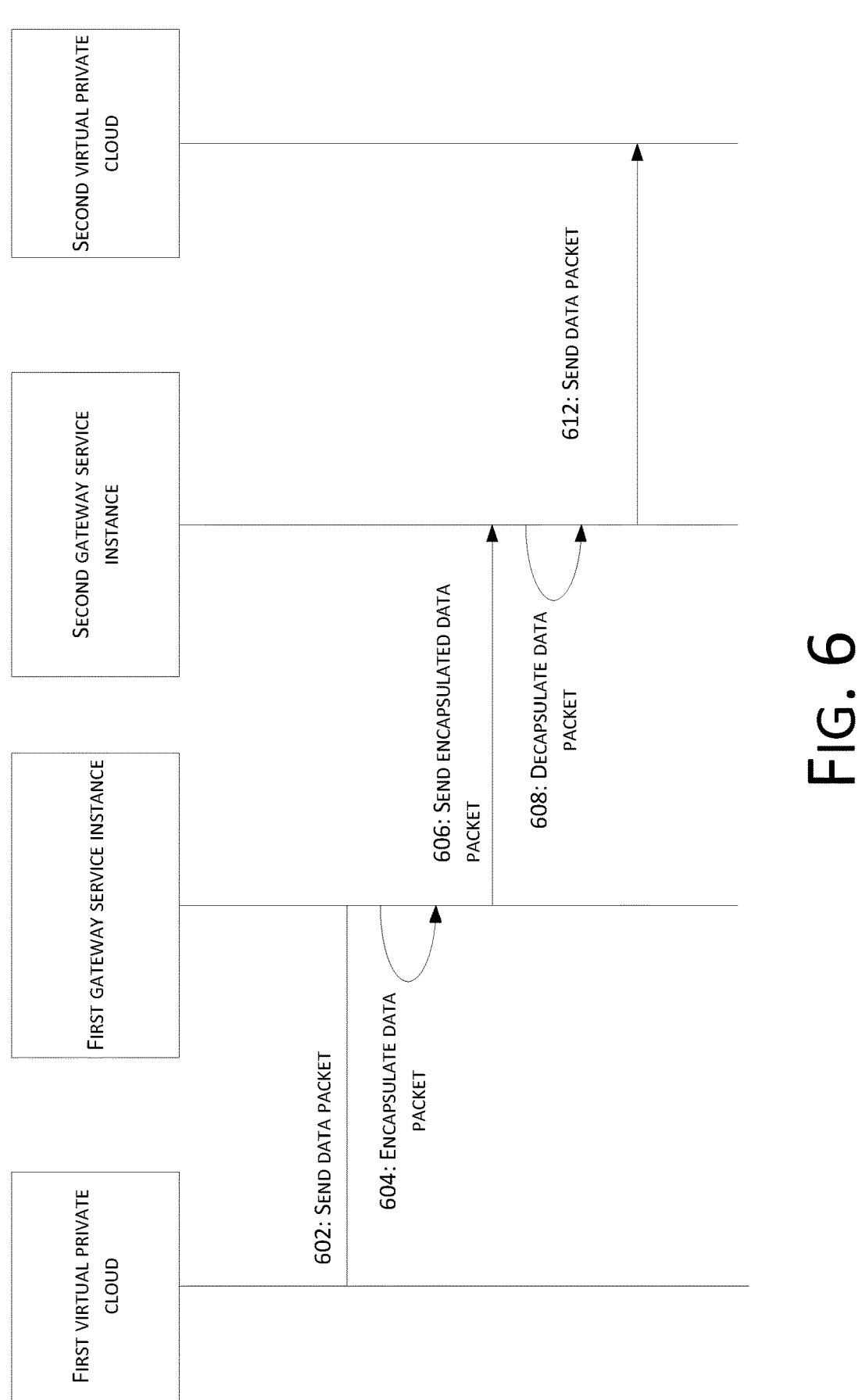
FIG. 6 is a schematic diagram of interaction between virtual private clouds according to the embodiments of the present disclosure.

Therefore, each dedicated gateway can correspond to a group of gateway nodes. Each gateway in the group of gateway nodes can be configured with a gateway service instance for the virtual private network. Each gateway service instance is attached with a virtual network card, which is used as a network interface to realize interactions with other networks. As shown in FIG. 6, the following steps may be included:

Step 602: A first virtual private cloud sends a data packet to a first gateway service instance.

Step 604: The first gateway service instance determines a link identifier of a second gateway service instance, and encapsulates a data packet.

Step 606: The first gateway service instance sends the encapsulated data packet to the second gateway service instance.

A data packet of the first virtual private cloud can be sent to the first gateway service instance, and the first gateway service instance then determines a destination address of the data packet, and queries a link identifier corresponding to the destination address based on a routing table of a virtual switch. The destination address can be an address of the second virtual private cloud, and the data packet is then an access for the second virtual private cloud. Correspondingly, a link identifier of the second gateway service instance of the second virtual private cloud can be queried. The data packet is then encapsulated according to the link identifier. For example, the link identifier is added to a header of the data packet. The data packet is then sent based on address information of the second gateway service instance.

Step 606: The second gateway service instance decapsulates the data packet.

Step 608: The second gateway service instance sends the data packet to a second virtual private cloud according to the link identifier.

After receiving the data packet, the second gateway service instance can decapsulate and transfer the data packet, obtain the link identifier, and then send the data packet to the second virtual private cloud.

Therefore, based on gateway services, a connection between different virtual private clouds can also be realized, and a cross-tenant VPC connection can be realized in a cloud scenario, providing more convenience for tenants. A tenant can be understood as a user who rents a cloud service.

In short, the embodiments of the present disclosure can realize multi-user isolation, and the traffic of different users' VPCs is encapsulated according to VXLAN through different tunnel IDs. The gateway of the embodiments of the present disclosure has high availability, and each virtual private network (VPC) can correspond to one or more than one gateway node. The stability and fault tolerance can also be improved through more than one gateway node, and load balancing and dynamic expansion and contraction can be achieved based on a OVS (Open Virtual machine) programmable flow table.

Gateway management and control in the embodiments of the present disclosure can be implemented based on NSM (Network Service Mesh), and gateway nodes can be implemented as unified scheduling. For management and control of a gateway, the gateway can be made to be serviceable, interact with a gateway service through API, and interact with a computing node deployment through a network card. Subsequent data can be transmitted based on link identifiers.

It needs to be noted that the method embodiments are expressed as a series of action combinations for the sake of simple description. However, one skilled in the art should know that the embodiments of the present disclosure are not limited by the described orders of actions, because certain steps may be performed in other orders or in parallel according to the embodiments of the present disclosure. Moreover, one skilled in the art should also know that the embodiments described in the specification belong to exemplary embodiments, and actions involved may not necessarily be required by the embodiments of the present disclosure.

On the basis of the foregoing embodiments, this embodiment further provides a data processing apparatus, which is applied to an electronic device of a computing node.

Figure 7:
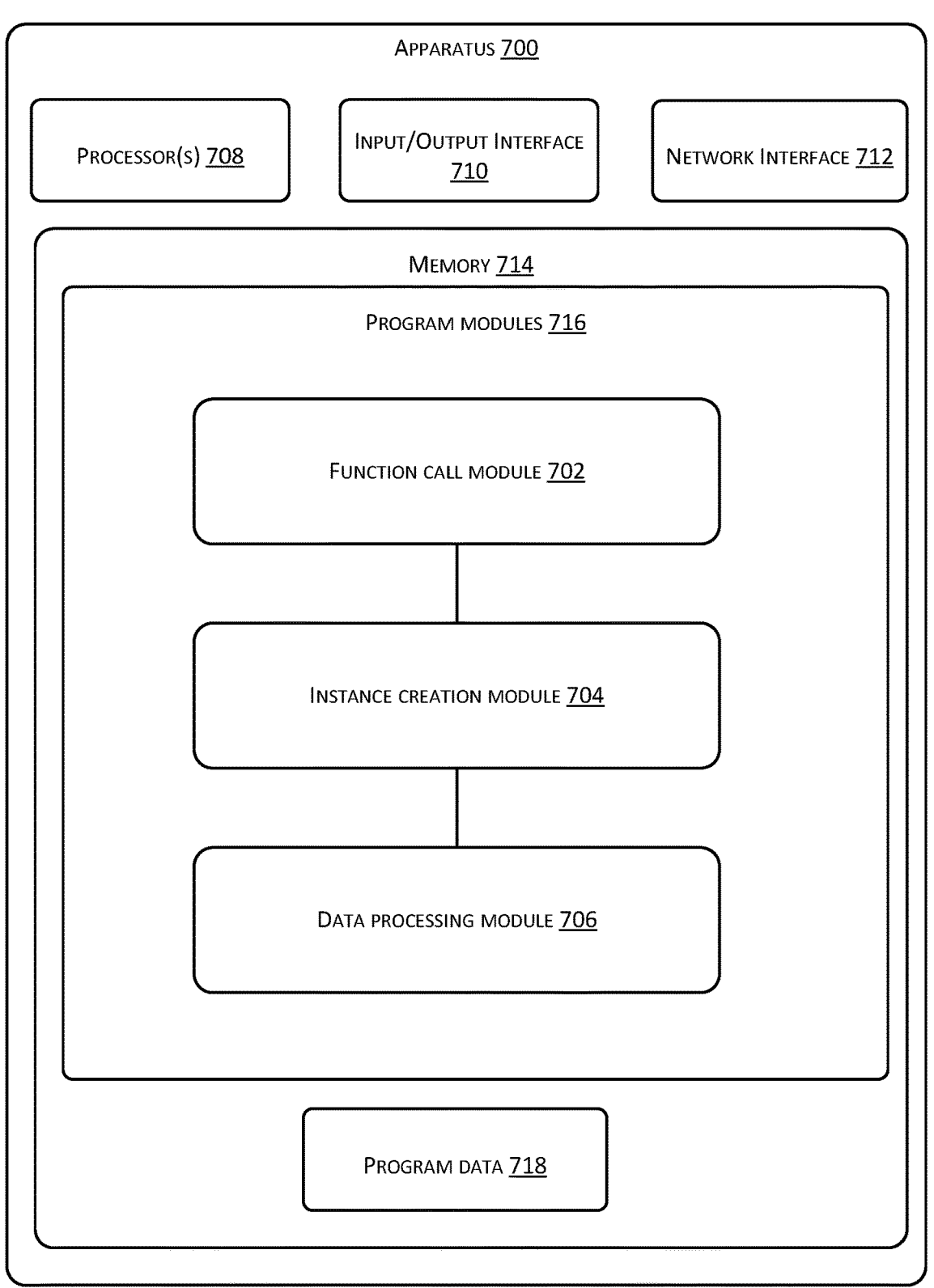
FIG. 7 is a structural block diagram of an example data processing apparatus of the present disclosure.

FIG. 7 shows a structural block diagram of an example data processing apparatus 700 of the present disclosure, which may specifically include the following modules:

a function call module 702 configured to receive a function call request;

an instance creation module 704 configured to create a function instance and a virtual network card thereof according to the function call request, so as to establish communication with at least one gateway node based on the virtual network card, wherein a gateway service instance of the gateway node is attached with a virtual network card; and a data processing module 706 configured to encapsulate a data packet corresponding to the function instance, and send thereof to the gateway node based on the virtual network card of the function instance, so as to be forwarded to a virtual private cloud through the gateway node.

The instance creation module 704 is configured to obtain network configuration information according to the function call request, the network configuration information including: a gateway service identifier and a gateway service address; create the virtual network card of the function instance according to the network configuration information; and create a network card container, and use the network card container to attach the virtual network card.

The instance creation module 704 is further configured to send a service creation request according to the received function call request; and obtain service configuration information, the service configuration information being determined according to the gateway service instance created by the gateway node, and the service configuration information including a gateway service identifier.

The instance creation module 704 is further configured to send a subscription request to the gateway service instance of the gateway node; and receive returned subscription information, wherein the subscription information includes a gateway service address.

The data processing module 706 is configured to receive a data packet; determine a gateway service identifier of a corresponding gateway node when a destination address of the data packet is an intranet address; determine a link identifier according to the gateway service identifier, encapsulate the data packet using the link identifier; and send the encapsulated data packet to the gateway node through the virtual network card of the function instance.

The data processing module 706 is further configured to determine a destination address of the data packet; and forward the data packet to a destination address of the data packet if the destination address is an external network address.

In implementations, the apparatus 700 may include one or more processors 708, an input/output interface 710, a network interface 712, and a memory 714.

In implementations, the memory 714 may include a form of computer readable media such as a volatile memory, a random access memory (RAM) and/or a non-volatile memory, for example, a read-only memory (ROM) or a flash RAM. The memory 714 is an example of a computer readable media. The memory 714 may include program modules 716 and program data 718. The program modules 716 may include the units described in the foregoing description and shown in FIG. 7.

The computer readable media may include a volatile or non-volatile type, a removable or non-removable media, which may achieve storage of information using any method or technology. The information may include a computer readable instruction, a data structure, a program module or other data. Examples of computer readable media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In short, for a function call request, a virtual network card of a function instance can be created to interact with a gateway node. The gateway node is used as a gateway of a virtual private cloud, on which a gateway service instance is attached with a virtual network card, which can process data of the virtual private cloud, thus realizing separation of function computing and gateway, and thereby affecting not the speed of cold start of function computing.

On the basis of the foregoing embodiments, this embodiment further provides a data processing apparatus, which is applied to an electronic device of a gateway node.

Figure 8:
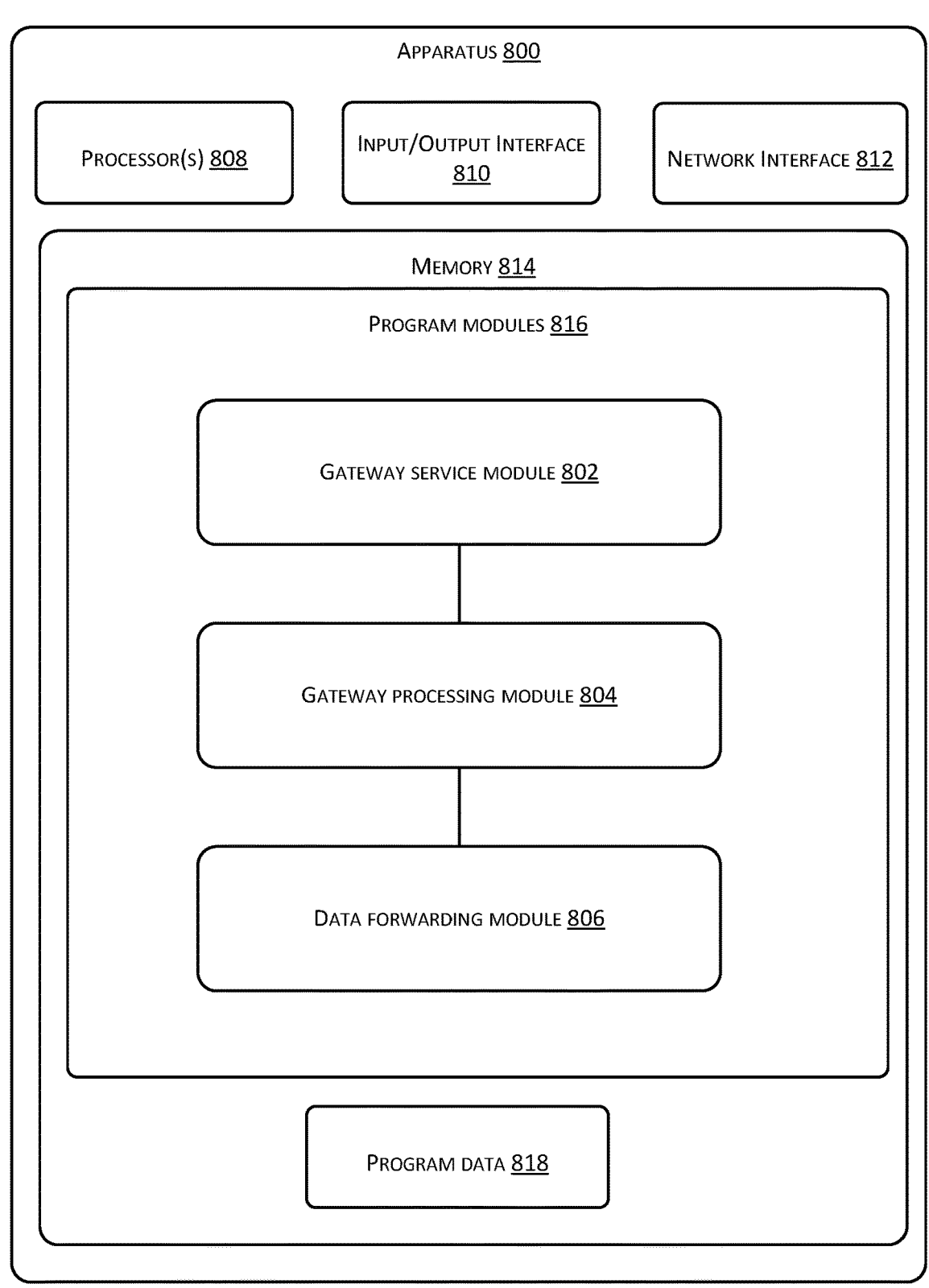
FIG. 8 is a structural block diagram of another data processing apparatus of the present disclosure.

FIG. 8 shows a structural block diagram of another example data processing apparatus 800 of the present disclosure, which may specifically include the following modules:

a gateway service module 802 configured to provide a gateway service instance, the gateway service instance being used as a gateway of a virtual private cloud, and the gateway service instance being configured with a virtual network card and communicating with an instance configured with a virtual network card;

a gateway processing module 804 configured to receive a data packet, the data packet being encapsulated and sent by the instance; and decapsulate the data packet, and determine a corresponding virtual private cloud; and a data forwarding module 806 configured to forward the data packet to the virtual private cloud based on the virtual network card of the gateway service instance.

The gateway service module 802 is further configured to receive a service creation request; determine service configuration information of the gateway service instance according to the service creation request, the service configuration information including a gateway service identifier; and send the service configuration information.

The gateway service module 802 is further configured to create a gateway service instance; create a virtual network card, and use the gateway service instance to attach the virtual network card.

The gateway service module 802 is further configured to receive a subscription request; generate subscription information according to a gateway service address of the gateway service instance; and send the subscription information.

The data forwarding module 806 is further configured to receive a data packet of the virtual private cloud based on the virtual network card of the gateway service instance. The gateway processing module 804 is further configured to encapsulate the data packet, and send the encapsulated data packet to a computing node to call the function instance of the computing node for processing.

In implementations, the apparatus 800 may include one or more processors 808, an input/output interface 810, a network interface 812, and a memory 814.

In implementations, the memory 814 may include a form of computer readable media such as a volatile memory, a random access memory (RAM) and/or a non-volatile memory, for example, a read-only memory (ROM) or a flash RAM. The memory 814 is an example of a computer readable media. The memory 814 may include program modules 816 and program data 818. The program modules 816 may include the units described in the foregoing description and shown in FIG. 8.

In short, the embodiments of the present disclosure can realize multi-user isolation, and the traffic of different users' VPCs is encapsulated according to VXLAN through different tunnel IDs. The gateway of the embodiments of the present disclosure has high availability, and each virtual private network (VPC) can correspond to one or more than one gateway node. The stability and fault tolerance can also be improved through more than one gateway node, and load balancing and dynamic expansion and contraction can be achieved based on a OVS (Open Virtual machine) programmable flow table.

Gateway management and control in the embodiments of the present disclosure can be implemented based on NSM (Network Service Mesh), and gateway nodes can be implemented as unified scheduling. For management and control of a gateway, the gateway can be made to be serviceable, interact with a gateway service through API, and interact with a computing node deployment through a network card. Subsequent data can be transmitted based on link identifiers.

The embodiments of the present disclosure also provide a non-volatile readable storage medium. One or more modules (programs) are stored in the storage medium. When the one or more modules are applied to a device, the device can execute instructions for steps of each method in the embodiments of the present disclosure.

The embodiments of the present disclosure provide one or more machine-readable media storing instructions that, when executed by one or more processors, cause an electronic device to execute one or more of the methods described in the above embodiments. In the embodiments of the present disclosure, the electronic devices include various types of devices such as a terminal device, a server (cluster), etc.

The embodiments of the present disclosure provide a software product, including computer programs/instructions. When the computer programs/instructions are executed, one or more of the methods described in the embodiments of the present disclosure are implemented.

Figure 9:
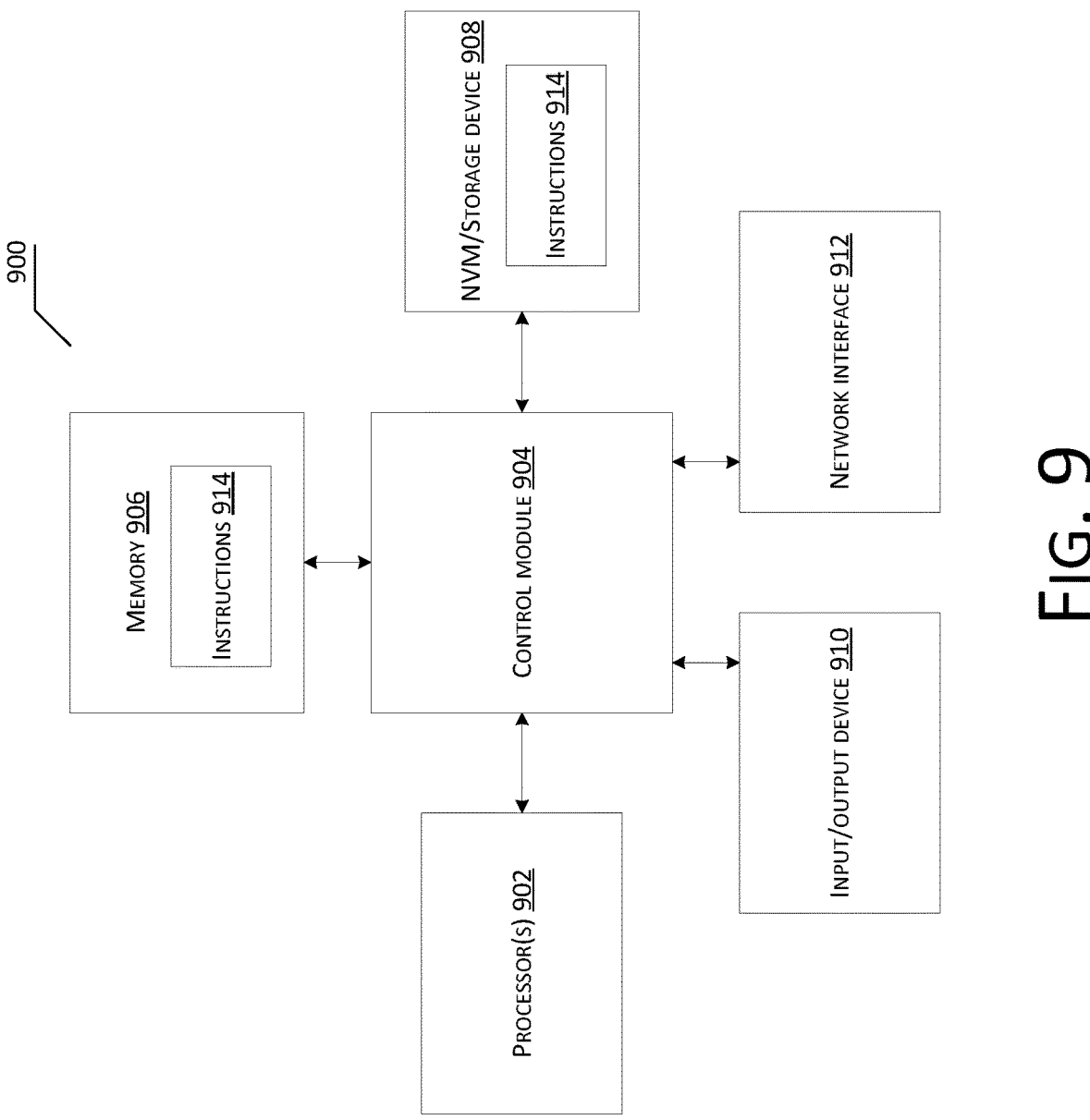
FIG. 9 is a schematic structural diagram of an apparatus according to the embodiments of the present disclosure.

The embodiments of the present disclosure can be implemented as an apparatus that uses any appropriate hardware, firmware, software, or any combination thereof to perform a desired configuration. The apparatus may include an electronic device such as a terminal device, a server (cluster), etc. FIG. 9 schematically illustrates an exemplary apparatus 900 that may be used to implement various embodiments described in this application.

In implementations, FIG. 9 illustrates an exemplary apparatus 900 having one or more processors 902, a control module (chipset) 904 coupled to at least one of the processor(s) 902, a memory 906 coupled to the control module 904, a non-volatile memory (NVM)/storage device 908 coupled to the control module 904, one or more input/output devices 910 coupled to the control module 904, and a network interface 912 coupled to the control module 904.

The processor 902 may include one or more single-core or multi-core processors, and the processor 902 may include any combination of general-purpose processors or special-purpose processors (such as graphics processors, application processors, baseband processors, etc.). In some embodiments, the apparatus 900 can serve as a terminal device, a server (cluster), and other devices described in the embodiments of the present disclosure.

In some embodiments, the apparatus 900 may include one or more computer-readable media (e.g., the memory 906 or the NVM/storage device 908) having instructions 914 and one or more processors 902 configured in combination with the one or more computer-readable media for executing instructions 914 to implement modules to perform the actions described in the present disclosure.

In implementations, the control module 904 may include any suitable interface controller to provide any suitable interface to at least one of the processor(s) 902 and/or any suitable device or component in communication with the control module 904.

The control module 904 may include a memory controller module to provide an interface to the memory 906. The memory controller module may be a hardware module, a software module and/or a firmware module.

The memory 906 may be used, for example, to load and store data and/or instructions 914 for the apparatus 900. In implementations, the memory 906 may include any suitable volatile memory, such as suitable DRAM. In some embodiments, the memory 906 may include Double Data Rate Type Quad Synchronous Dynamic Random Access Memory (DDR4 SDRAM).

In implementations, the control module 904 may include one or more input/output controllers to provide interfaces to the NVM/storage device(s) 908 and the input/output device(s) 910.

For example, the NVM/storage device 908 may be used to store data and/or instructions 914. The NVM/storage device 908 may include any suitable non-volatile memory (e.g., flash memory) and/or may include any suitable non-volatile storage device(s) (e.g., one or more hard drives (HDD), one or more compact disc (CD) drives, and/or one or more digital versatile disc (DVD) drives).

The NVM/storage device 908 may include a storage resource that is physically a part of a device on which the apparatus 900 is installed, or may be accessible by the device and not necessarily be a part of the device. For example, the NVM/storage device 908 may be accessed over a network via the input/output device(s) 910.

The input/output device(s) 910 may provide an interface for the apparatus 900 to communicate with any other suitable device. The input/output device(s) 910 may include communication components, audio components, sensor components, and the like. The network interface 912 may provide an interface for the apparatus 900 to conduct communication over one or more networks. The apparatus 900 may communicate wirelessly with one or more components of wireless networks according to any standard and/or protocol of one or more wireless network standards and/or protocols, such as accessing wireless networks based on communication standards, such as WiFi, 2G, 3G, 4G, 5G, etc., or a combination thereof for conducting wireless communication.

In implementations, at least one of the processor(s) 902 may be packaged with the logic of one or more controllers of the control module 904 (e.g., a memory controller module). In implementations, at least one of the processor(s) 902 may be packaged with the logic of one or more controllers of the control module 904 to form a system-in-package (SiP). In implementations, at least one of the processor(s) 902 may be integrated on the same die with the logic of the one or more controllers of the control module 904. In implementations, at least one of the processor(s) 902 may be integrated on the same die with the logic of the one or more controllers of the control module 904 to form a system on chip (SoC).

In various embodiments, the apparatus 900 may be, but not limited to, a terminal device such as a server, a desktop computing device, or a mobile computing device (e.g., a laptop computing device, a handheld computing device, a tablet computer, a netbook, etc.). In various embodiments, the apparatus 900 may have more or fewer components and/or a different architecture. For example, in some embodiments, the apparatus 900 includes one or more cameras, a keyboard, a liquid crystal display (LCD) screen (including a touchscreen display), a non-volatile memory port, multiple antennas, a graphics chip, an application-specific integrated circuit (ASIC) and speakers.

The main control chip can be used as the processor or control module in a detection apparatus. Sensor data and location information can be stored in the memory or NVM/storage. A sensor group can be used as the input/output device, and a communication interface can include a network interface.

Since the apparatus embodiments are basically similar to the method embodiments, the description thereof is relatively simple. For related parts, a reference can be made to the parts of the description of the method embodiments.

Each embodiment in the present disclosure is described in a progressive manner. Each embodiment focuses on aspects different from other embodiments. The same and similar parts of each embodiment can be referenced to each other.

The embodiments of the present disclosure are described with reference to flowcharts and/or block diagrams of methods, apparatus (systems), and computer program products according to the embodiments of the present disclosure. It will be understood that each process and/or block of the flowcharts and/or block diagrams, and combinations of processes and/or blocks in the flowcharts and/or block diagrams, can be implemented by computer program instructions. These computer program instructions may be provided to a general purpose computer, a special purpose computer, an embedded processor, or a processor of other programmable device to produce a machine, to cause the instructions to generate an apparatus for implementing the functions specified in one or more processes of the flowcharts and/or one or more blocks of the block diagrams through the computer or the processor of other programmable device.

These computer program instructions may also be stored in a computer-readable storage device that can direct a computer or other programmable device to function in a particular manner, such that the instructions stored in the computer-readable storage device produce an article of manufacture including an instruction apparatus which implements the functions specified in one or more processes of the flowcharts and/or one or more blocks of the block diagrams.

These computer program instructions may also be loaded onto a computer or other programmable device to cause a series of operational steps to be performed on the computer or other programmable device so as to produce a computer implemented process, such that the instructions executed on the computer or other programmable device provide steps for implementing the functions specified in one or more processes of the flowcharts and/or one or more blocks of the block diagrams.

While the exemplary embodiments of the embodiments of the present disclosure have been described, additional changes and modifications can be made to these embodiments by one skilled in the art once the basic inventive concepts are understood. Therefore, the appended claims are intended to be interpreted to cover the exemplary embodiments and all the changes and modifications that fall within the scope of the embodiments of the present disclosure.

Finally, it also needs to be noted that in the present disclosure, relational terms such as "first" and "second", etc., are only used to distinguish one entity or operation from another, and do not necessarily require or imply that these entities or operations have any such actual relationship or order. Furthermore, the term "including", "containing" or any other variations thereof is intended to cover a non-exclusive inclusion such that a process, method, article, or terminal device including a series of elements includes not only those elements, but also includes elements that are not expressly listed, or also include elements that are inherent in such a process, method, article, or terminal device. Without further limitations, an element defined by the phrase "including a . . . " does not exclude the presence of additional identical elements in a process, method, article or terminal device comprising such element.

Data processing methods and apparatuses, electronic devices, and storage media provided by the application have been introduced in detail above. In the present disclosure, specific examples are used to illustrate the principles and implementations of the present disclosure. The description of the above examples is only used to help understand the methods of the present disclosure and their core ideas. At the same time, for one of ordinary skill in the art, according to the ideas of the present disclosure, there will be changes in the specific implementations and application scopes. In summary, the contents of the present disclosure should not be construed as limitations to the present disclosure.

What is claimed is:

1. A method implemented by a computing device, the method comprising:

receiving a function call request;

creating a function instance and a first virtual network card of the function instance in the computing device according to the function call request through a cold start of function computing, to enable the first virtual network card to establish communication with at least one gateway node, wherein a gateway service instance of the at least one gateway node is attached with a second virtual network card; and sending a data packet corresponding to the function instance to the gateway node through the first virtual network card of the function instance after the data packet is encapsulated, to enable the gateway node to forward the encapsulated data packet to a virtual private cloud.

2. The method according to claim 1, wherein creating the function instance and the second virtual network card of the function instance according to the function call request comprises:

obtaining network configuration information according to the function call request, wherein the network configuration information includes: a gateway service identifier and a gateway service address;

creating the function instance and the first virtual network card according to the network configuration information; and creating a network card container and using the network card container to attach the first virtual network card.

3. The method according to claim 2, wherein creating the first virtual network card of the function instance according to the network configuration information comprises:

creating more than one virtual network card of the function instance according to the network configuration information, the more than one virtual network card comprising at least: a virtual network card for the virtual private cloud and a virtual network card for a public network;

creating the network card container and using the network card container to attach the first virtual network card, comprises:

creating a network card container for each virtual network card of the more than one virtual network card, and using the network card container to attach a corresponding virtual network card of the more than one virtual network card.

4. The method according to claim 1, further comprising:

sending a service creation request to a group of gateway nodes according to the function call request, wherein the group of gateway nodes includes the at least one gateway node;

obtaining a group of service configuration information, the group of service configuration information being determined according to the gateway service instance created by the gateway node, and the group of service configuration information including gateway service identifiers corresponding to the group of gateway nodes.

5. The method according to claim 4, further comprising:

sending a subscription request to the gateway service instance of the at least one gateway node; and receiving returned subscription information, wherein the subscription information includes a gateway service address.

6. The method according to claim 1, wherein encapsulating the data packet corresponding to the function instance and sending the encapsulated data packet to the gateway node through the first virtual network card comprises:

receiving the data packet;

determining, by the first virtual network card of the function instance, a gateway service identifier of a corresponding gateway node when a destination address of the data packet is an intranet address;

determining a link identifier according to the gateway service identifier, and using the link identifier to encapsulate the data packet; and sending the encapsulated data packet to the corresponding gateway node.

7. The method according to claim 1, further comprising:

determining a destination address of the data packet; and forwarding the data packet to the destination address if the destination address of the data packet is an external network address.

8. One or more computer readable media storing executable instructions that, when executed by one or more processors, cause the one or more processors to perform acts comprising:

receiving a function call request;

creating a function instance and a first virtual network card of the function instance according to the function call request through a cold start of function computing, to enable the first virtual network card to establish communication with at least one gateway node, wherein a gateway service instance of the at least one gateway node is attached with a second virtual network card; and sending a data packet corresponding to the function instance to the gateway node through the first virtual network card of the function instance after the data packet is encapsulated, to enable the gateway node to forward the encapsulated data packet to a virtual private cloud.

9. The one or more computer readable media according to claim 8, wherein creating the function instance and the second virtual network card of the function instance according to the function call request comprises:

obtaining network configuration information according to the function call request, wherein the network configuration information includes: a gateway service identifier and a gateway service address;

creating the function instance and the first virtual network card according to the network configuration information; and creating a network card container and using the network card container to attach the first virtual network card.

10. The one or more computer readable media according to claim 9, wherein creating the first virtual network card of the function instance according to the network configuration information comprises:

creating more than one virtual network card of the function instance according to the network configuration information, the more than one virtual network card comprising at least: a virtual network card for the virtual private cloud and a virtual network card for a public network;

creating the network card container and using the network card container to attach the first virtual network card, comprises:

creating a network card container for each virtual network card of the more than one virtual network card, and using the network card container to attach a corresponding virtual network card of the more than one virtual network card.

11. The one or more computer readable media according to claim 8, the acts further comprising:

sending a service creation request to a group of gateway nodes according to the function call request, wherein the group of gateway nodes includes the at least one gateway node;

obtaining a group of service configuration information, the group of service configuration information being determined according to the gateway service instance created by the gateway node, and the group of service configuration information including gateway service identifiers corresponding to the group of gateway nodes.

12. The one or more computer readable media according to claim 11, the acts further comprising:

sending a subscription request to the gateway service instance of the at least one gateway node; and receiving returned subscription information, wherein the subscription information includes a gateway service address.

13. The one or more computer readable media according to claim 8, wherein encapsulating the data packet corresponding to the function instance and sending the encapsulated data packet to the gateway node through the first virtual network card comprises:

receiving the data packet;

determining, by the first virtual network card of the function instance, a gateway service identifier of a corresponding gateway node when a destination address of the data packet is an intranet address;

determining a link identifier according to the gateway service identifier, and using the link identifier to encapsulate the data packet; and sending the encapsulated data packet to the corresponding gateway node.

14. The one or more computer readable media according to claim 8, the acts further comprising:

determining a destination address of the data packet; and forwarding the data packet to the destination address if the destination address of the data packet is an external network address.

15. An apparatus comprising:

one or more processors; and memory storing executable instructions that, when executed by one or more processors, cause the one or more processors to perform acts comprising:

providing a gateway service instance, the gateway service instance being used as a gateway of one or more virtual private clouds and configured with a first virtual network card that is created through a cold start of function computing, and the gateway service instance being configured to communicate with an instance configured with a second virtual network card, wherein the first virtual network card and the second virtual network card are used to implement a separation of the function computing and the gateway;

receiving a data packet based on the first virtual network card of the gateway service instance, and the data packet being sent after encapsulated by the instance configured with the second virtual network card;

decapsulating the data packet, and determining a corresponding virtual private cloud; and forwarding the data packet to the corresponding virtual private cloud.

16. The apparatus according to claim 15, the acts further comprising:

receiving a service creation request;

determining service configuration information of the gateway service instance according to the service creation request, wherein the service configuration information includes a gateway service identifier; and sending the service configuration information.

17. The apparatus according to claim 15, the acts further comprising:

creating the gateway service instance; and creating the first virtual network card, and using the gateway service instance to attach the first virtual network card.

18. The apparatus according to claim 17, the acts further comprising:

receiving a subscription request;

generating subscription information according to a gateway service address of the gateway service instance; and sending the subscription information.

19. The apparatus according to claim 15, the acts further comprising:

receiving a new data packet from the corresponding virtual private cloud;

encapsulating the new data packet, and sending the encapsulated new data packet to a computing node through the first virtual network card of the gateway service instance, so as to call a function instance of the computing node for processing.

20. The apparatus according to claim 15, wherein determining the corresponding virtual private cloud comprises:

determining a corresponding link identifier from the data packet after the data packet is decapsulated; and determining the corresponding virtual private cloud based on the link identifier.

* * * * *